(12) United States Patent
Potter et al.

(10) Patent No.: US 7,615,954 B1
(45) Date of Patent: Nov. 10, 2009

(54) DENSITY SENSING, SOLID STATE, PUMP SWITCHING SYSTEM

(75) Inventors: Richard W. Potter, Winfield, IL (US); Anton Belehradek, Downers Grove, IL (US); Adam Pleticha, Joliet, IL (US)

(73) Assignee: Metropolitan Industries, Inc., Romeville, IL (US)

( * ) Notice: Subject to any disclaimer, the term of this patent is extended or adjusted under 35 U.S.C. 154(b) by 624 days.

(21) Appl. No.: 11/324,920

(22) Filed: Jan. 4, 2006

Related U.S. Application Data

(60) Provisional application No. 60/641,532, filed on Jan. 5, 2005.

(51) Int. Cl.
*G01F 23/284* (2006.01)

(52) U.S. Cl. .................. 318/482; 318/291; 318/293

(58) Field of Classification Search ............ 318/280, 318/287, 291, 293, 480–482; 388/929, 933
See application file for complete search history.

(56) References Cited

U.S. PATENT DOCUMENTS

| | | | | |
|---|---|---|---|---|
| 3,842,397 A | * | 10/1974 | Sindle | 367/111 |
| 4,487,065 A | * | 12/1984 | Carlin et al. | 73/290 V |
| 4,610,164 A | * | 9/1986 | Sobue et al. | 73/290 V |
| 4,701,681 A | * | 10/1987 | Koike | 318/16 |
| 4,963,807 A | * | 10/1990 | Wendling | 318/632 |
| 5,105,661 A | * | 4/1992 | Sekita et al. | 73/290 V |
| 5,369,347 A | * | 11/1994 | Yoo | 318/568.12 |
| 5,432,415 A | * | 7/1995 | Ittah et al. | 318/483 |
| 5,438,868 A | * | 8/1995 | Holden et al. | 73/290 V |
| 5,539,289 A | * | 7/1996 | Wiget | 318/483 |
| 5,803,334 A | * | 9/1998 | Patel et al. | 226/45 |
| 6,329,774 B1 | * | 12/2001 | Ariav | 318/282 |
| 6,774,596 B1 | * | 8/2004 | Bisset | 318/568.11 |

* cited by examiner

*Primary Examiner*—Bentsu Ro
(74) *Attorney, Agent, or Firm*—Husch Blackwell Sanders Welsh & Katz

(57) ABSTRACT

A pump control system incorporates one or more solid state level sensors as well as solid state pump control switches. Elimination of mechanical or electrode-mechanical parts by using ultrasonically based fluid level sensors as well as solid state switches for motor control enhances reliability and results in reduced power consumption and dissipation.

22 Claims, 2 Drawing Sheets

DENSITY SENSING, SOLID STATE, PUMP SWITCHING SYSTEM

CROSS REFERENCE TO RELATED APPLICATION

This application claims the benefit of the filing date of U.S. Provisional Application Ser. No. 60/641,532 filed Jan. 5, 2005 and entitled "Density Sensing, Solid State, Sump Pump Switching System".

FIELD OF THE INVENTION

The invention pertains to pump control systems. More particularly, the invention pertains to such control systems which incorporate solid state level sensors in combination with solid state motor drive circuits.

BACKGROUND

A variety of pump control systems are known in the prior art. Many of these systems can be used to control fluid levels in tanks or sumps.

Representative prior art systems include those disclosed in U.S. Pat. No. 6,565,325 entitled "Sensor Based Control System", and in U.S. Pat. No. 5,707,211 entitled "Variable Speed Pump System with a Hydropneumatic Buffer/Pressure Tank". Each of the noted patents is assigned to the Assignee hereof and is incorporated herein by reference.

In various of the known pump control systems levels are sensed by switch carrying floats. Others use electromechanical components for switching electrical energy to the respective pump motor or motors.

It has been recognized that it would be desirable to eliminate electromechanical or mechanical components from such systems to improve reliability thereof. There is thus an ongoing need for more reliable pump control systems. Preferably such improved reliability can be achieved without substantially increasing either the manufacturing costs or the complexity of such systems.

DETAILED DESCRIPTION

Figure 1:
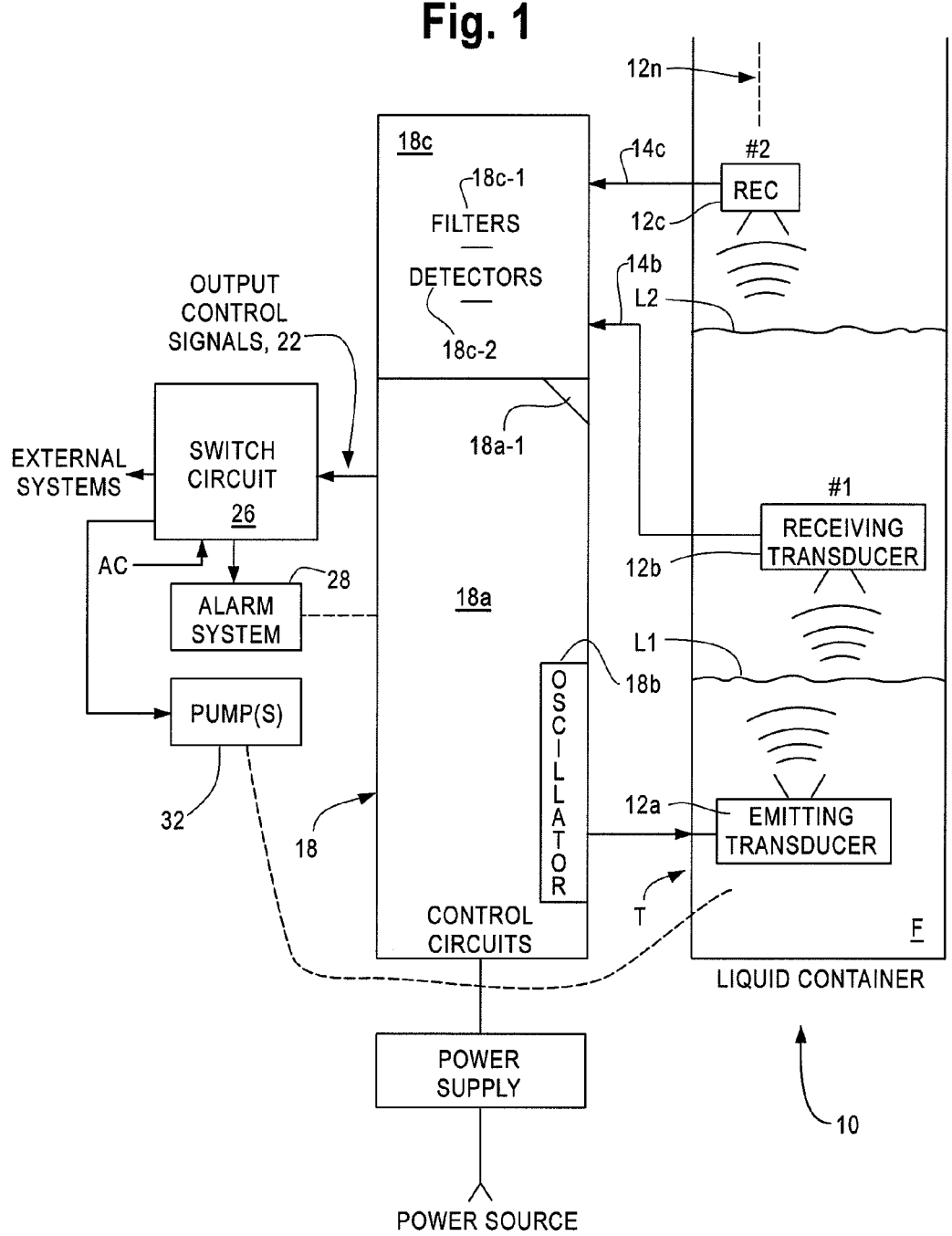
FIG. 1 is a diagram of a system in accordance with the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In accordance with the invention, solid state circuitry is provided both for liquid level management as well as for motor power switching. Level detection can be accomplished by detecting the strength of sonic/ultrasonic wave conduction between a sonic/ultrasonic transmitter(s) and a separately located sonic/ultrasonic receiver(s).

A differential in the strength of the received sonic/ultrasonic signal(s) is experienced between the presence of air between the transmitter and receiver(s), and when there is a body of liquid between the transmitter and receiver. A method in accordance with the invention detects the density differential between air and a liquid (water).

In one aspect of the invention, operation of a pump's electric motor produces sound waves that potentially interfere with detection of received sonic/ultrasonic waves used for level detection. An electronic circuit can be employed to discriminate between transmitted waves that have been received and spurious waves that have been received. A method in accordance with the invention reduces sonic/ultrasonic interference and provides more reliable operation.

In another aspect of the invention; the detected presence of liquid or air at specific elevations in a tank or sump is processed and connected to power switching components to operate the pump(s) motor(s) as needed.

Solid state, semiconductor power switching devices configured in accordance with the invention provide reliability that is superior to mechanical switches with moving parts.

In a disclosed embodiment solid state switches such as IGBT's (insulated gate bipolar transistors) or MOSFET (metal oxide semiconductor field effect transistor) and associated standard or fast recovery diodes can be used to control energy for pump motor(s). By configuring the devices as described below, it is possible to switch line voltage and associated AC alternating currents into a resistive or inductive load with minimal dissipative losses.

Semiconductor switch devices can be enabled by applying a gate-to-source voltage across the device terminals. In this state current flows through a respective diode/switch pair to the load.

When the AC cycle is in the positive region relative to one diode and switch combination, current flows therethrough into a load. Current through the other diode and switch combination leg is impeded due to the blocking action of that diode. The reverse voltage across a non-conducting switch is restricted to the voltage drop across its intrinsic body diode thereby protecting the device.

During the negative portion of the AC cycle current flows through the other diode/switch pair and into the load. Current fails to enter the one diode and switch combination due to the blocking action of the respective diode. As described above, the reverse voltage applied to that switch is restricted to the voltage drop across the switch's intrinsic body diode.

By removing the gate-to-source voltage from the individual switches, current flow can be disabled because of the high impedance of the switches, such as Collector-to-Emitter (IGBT) or Drain-to-Source (MOSFET) in the off state.

In another aspect of the invention, the switching speed of the switch current can be controlled through selected gate drive techniques. As a result, no snubbers are required to keep the switching devices from failing. Further, the switching devices can be formed on a singular silicon substrate. This results in low interconnect losses, low electrical noise, and ease of product assembly. Because only a small voltage signal is required to enable any of the switches, low power consumption as well as relatively low dissipation are obtainable.

In another aspect of the invention, a tank can be controlled using one or more sonic/ultrasonic transmitters. The transmitters transmit, through the fluid in the tank to one or more receivers. Control circuits coupled to transmitters and receivers provide the necessary processing.

A pump switching system can be used to control pump(s) which in turn raise or lower the level of fluid. The present system can be used in the storage of fluids, such as in a water storage tank or to control fluid level in a sump all without limitation.

FIG. 1 illustrates an overall view of system 10 in accordance with the invention. A tank T contains a liquid or fluid F which can have a variety of levels such as L1, L2. An ultrasonic density sensing system 12, which includes at least one ultrasonic transmitter 12a and a plurality of ultrasonic receivers 12b, 12c ... 12n, is coupled to the tank T. It will be understood that the exact arrangement and/or coupling mechanism of the elements 12a, 12b, 12c ... 12n would be understood by those of skill in the art and are not limitations of the present invention. The sensors 12b, 12c ... 12n can be used to sense and/or control a liquid level, such as L1, L2 in the tank T.

System 10 can also incorporate control circuitry 18 which can include processing circuitry 18a. The circuitry 18a might be implemented with a variety of configurations such as programmable controllers, programmable logic arrays, programmable processors and associated software 18a-1 or the like all without limitation.

Circuitry 18a is in turn coupled to an output oscillator 18b and receiving circuitry 18c which can include filters 18c-1 as well as detection circuitry 18c-2. Filters 18c-1 can discern signals being emitted from respective ultrasonic transducers such as 18b, c ... n. Filters 18c-1 reject or minimize spurious noise and signals received from receiving transducers 12b, 12c ... 12n.

Oscillator circuitry 18b emits electrical signals of a predetermined ultrasonic frequency which in turn drive ultrasonic output transducer 12a. Detectors 18c-2 can be implemented as hardware or software or combinations thereof for purposes of processing signals received from receiving transducers 12b, 12c ... 12n. For example, and without limitation, detectors 18c-2 can incorporate circuitry and/or software for determining when the filtered signal from receiving ultrasonic transducer 12b is above or below a signal level that is associated with a level such as L1 which might be above or below the transducer 12b.

In the event that the level L1 is above the transducer 12b, signals received from the transducer 12b will be dependent on the density characteristics of the fluid F in the tank T. Where the level L1 is below the level of the transducer 12b output signals received therefrom will reflect the density of the ambient air in the tank T between the level L1 and the transducer 12b.

Similarly signals from the receiver 12c will be indicative of the level L2 of the fluid F in the tank. Where the level L2 is higher in the tank than is the location of the receiver 12c the received signals on the line of 14c will reflect the presence of the fluid F and its associated density in the entirety of the space between the emitter 12a and the receiver 12c. Where the level L2 is below the level of the receiver 12c the differing density of the air above the level L2 will alter the characteristics of the received signals from the transducer 12a which travel in part through the fluid F and in part through the ambient air.

Output signals from the detectors 18c-2, which could be binary signals, can in turn be coupled to processing circuitry 18a, which could incorporate any necessary timing circuitry or timing software, to detect the level or presence of fluid F relative to the receivers 12b, 12c ... 12n. Processing circuitry 18a can in turn emit output control signals 22 to a variety of circuits including switching circuitry 26 and/or alarm circuitry 28 all without limitation. Switching circuitry 26 can in turn provide signals to the alarm system 28 and/or actuate one or more pumps 32 for purposes of adjusting the level of fluid F in tank T.

Figure 2:
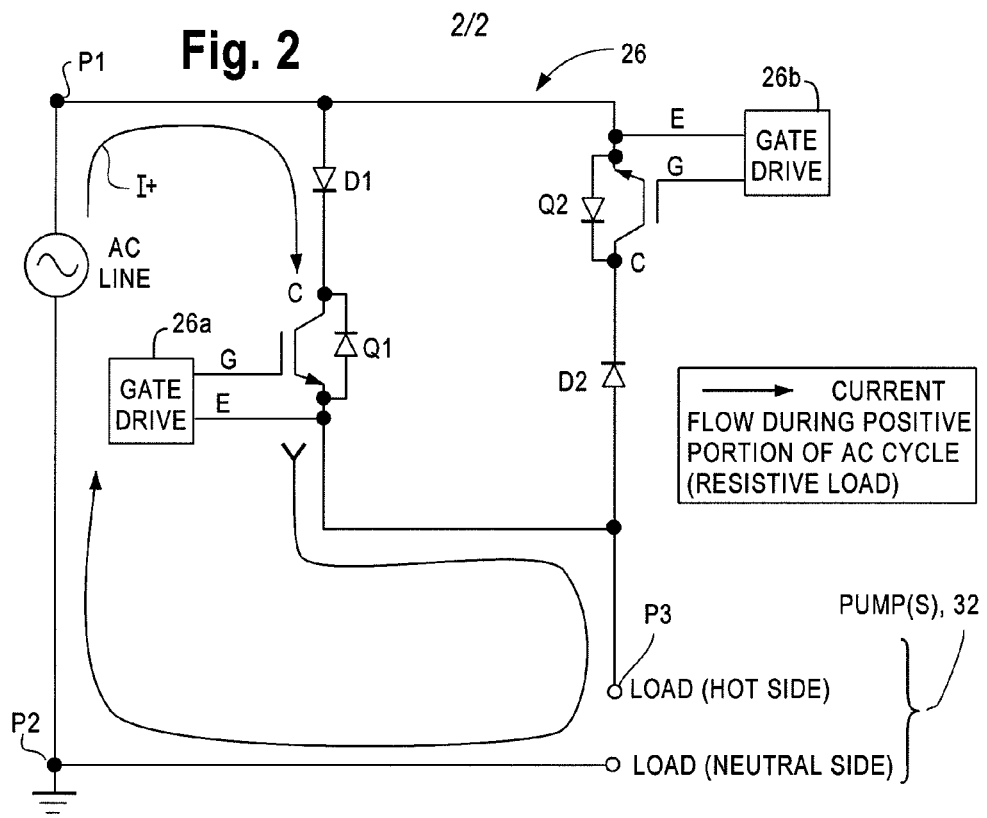
FIG. 2 is a schematic block diagram illustrating current flow in one portion of an alternating current cycle.
Figure 3:
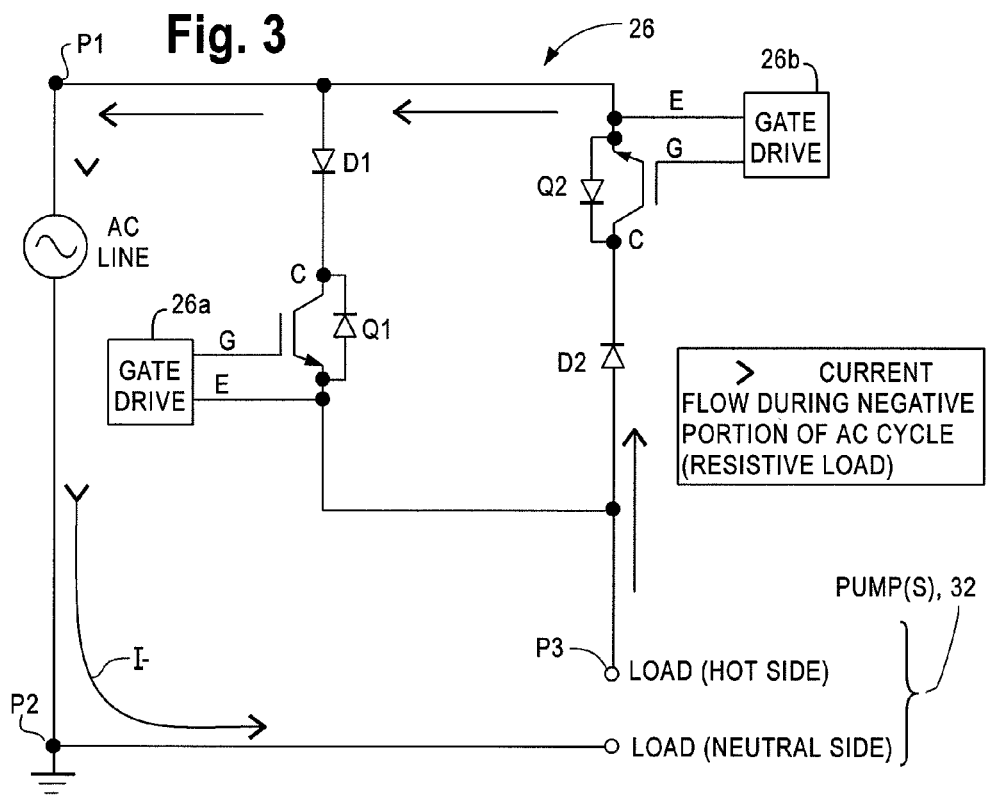
FIG. 3 is a schematic/block diagram circuit illustrating current flow in another portion of an alternating current cycle.

FIGS. 2 and 3 illustrate exemplary switching circuitry 26 in two different conditions. In FIG. 2, circuitry 26 is illustrated with a current flow to a load such as pump(s) 32 during a first or positive portion of an AC cycle, primarily into a resistive load. FIG. 3 illustrates the switching circuitry 26 where the alternating current flow is exhibiting a second or negative portion of the cycle. It will be understood that the switching circuitry 26 of FIGS. 2 and 3 is exemplary only. Other alternates come within the spirit and scope of the present invention.

As illustrated in FIG. 2, during a first or positive portion of an AC cycle, current I+ can flow through input ports P1, P2 through a diode D1 and switch Q1. Where the drive circuitry 26a provides appropriate gate-to-source of voltage to the switch Q1 the switch Q1 will conduct and current can then flow from the output port P3 through the load, such as pump 32. During this portion of the cycle, current flow through the D2/Q2 branch is impeded due to the blocking action of diode D2. The reverse voltage across switch Q2 should be restricted to the voltage drop across its intrinsic body diode thereby protecting device Q2.

As illustrated in FIG. 3, in a second or negative portion of the alternating current cycle a current I− can flow in the indicated direction through the load, such as the pump 32 through diode D2, conducting switch Q2 and output P1 to the source. Current I− in FIG. 3 is blocked from flowing into the D1/Q1 by the reverse biased diode D1. As noted above, the reverse voltage applied across the switch Q1 should be restricted to the voltage drop across its intrinsic body diode.

As would be understood by those of skill in the art, the presence of an appropriate gate-to-source voltage across the respective switches Q1, Q2 can produce a current flow in the appropriate direction to the respective switch. Current flow can be disabled by removal of the gate-to-source voltage in view of a high impedance between the respective collector emitter. Representative switches can included insulated gate bipolar transistors or metal oxide semiconductor field effect transistors. In the former a high impedance can be present across the collector-to-emitter junction in the absence of appropriate gate drive. In the latter case a high impedance will be present across the drain-to-source junction in the absence of an appropriate drive voltage.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A system comprising:
a plurality of ultrasonic transmitters;
a plurality of ultrasonic receivers;
control circuits coupled to the transmitters and the receivers;
first and second solid state switch elements coupled to the control circuits;
first and second load ports, one of the switch elements can conduct a varying current in one direction relative to the ports, the other switch element can conduct a varying current in the opposite direction relative thereto; and
where the control circuits evaluate signals from at least some of the ultrasonic receivers relative to enabling at least one of the switch elements to enter a conducting state;
where the enabling includes respectively enabling one of the switch elements at a time to enter a respective conducting state;

where the conducting states each define a different current flow path;

where the control circuits activate at least selected ones of the transmitters, the activated ones of the transmitters emit ultrasonic signals;

where ultrasonic signals emitted by the selected ones of the transmitters are incident on at least some of the receivers; and where at least some of the receivers couple indicia corresponding to incident ultrasonic signals to the control circuits.

2. A system as in claim 1 where the switch elements comprise one of bipolar transistors, or, field effect transistors.

3. A system as in claim 2 where the bipolar transistors comprise insulated gate bipolar transistors.

4. A system as in claim 2 where the field effect transistors comprise metal oxide field effect transistors.

5. A system as in claim 1 which includes first and second energy input ports.

6. A system as in claim 5 where the switch elements comprise one of bipolar transistors, or, field effect transistors.

7. A system comprising:
an ultrasonic transmitter;
at least two ultrasonic receivers where the receivers are displaced first and second different distances from the transmitter;
control circuits coupled to the transmitter and the receivers;
first and second solid state switch elements coupled to the control circuits;
first and second load ports, one of the switch elements can conduct a varying current in one direction relative to the ports, the other switch element can conduct a varying current in the opposite direction relative thereto;
where ultrasonic signals emitted by the transmitter are incident on the receivers; and
where the receivers couple indicia corresponding to incident ultrasonic signals to the control circuits to thereby activate the switch elements.

8. A system as in claim 7 where the control circuits, in response to indicia from at least some of the receivers, couple first and second control signals to the first and second switch elements.

9. A system as in claim 8 where the control signals cause the respective switch elements to alternately enter the respective conducting state.

10. A system as in claim 9 where an applied alternating current can be coupled, via the respective alternating states, to a load.

11. A system as in claim 7 where the switch elements comprise one of bipolar transistors, or, field effect transistors.

12. A system as in claim 11 where the bipolar transistors comprise insulated gate bipolar transistors.

13. A system as in claim 11 where the field effect transistors comprise metal oxide field effect transistors.

14. A system is in claim 7 where the control circuits evaluate signals from at least some of the ultrasonic receivers relative to enabling at least one of the switch elements to enter a conducting state.

15. A system as in claim 7 where the enabling includes respectively enabling one of the switch elements at a time to enter a respective conducting state.

16. A system as in claim 15 where the conducting states each define a different current flow path.

17. A system as in claim 16 which includes first and second energy input ports.

18. A system as in claim 16 where the switch elements comprise one of bipolar transistors, or, field effect transistors.

19. A system comprising:
at least one ultrasonic transmitter;
at least two ultrasonic receivers;
control circuits coupled to the transmitter and the receivers;
first and second solid state switch elements coupled to the control circuits;
first and second load ports, one of the switch elements can conduct a varying current in one direction relative to the ports, the other switch element can conduct a varying current in the opposite direction relative thereto;
where the control circuits activate the transmitter which in response thereto emits ultrasonic signals, where ultrasonic signals emitted by the transmitter are incident on the receivers; and
where the receivers couple indicia corresponding to incident ultrasonic signals to the control circuits thereby enabling one of the switch elements at a time to enter a respective conducting state, and where the conducting states each define a different current flow path.

20. A system as in claim 19 where the switch elements comprise one of bipolar transistors, or, field effect transistors.

21. A system as in claim 20 where the receivers are displaced first and second different distances from the transmitter.

22. A system as in claim 21 where one receiver is positioned between the transmitter and another receiver.

* * * * *

UNITED STATES PATENT AND TRADEMARK OFFICE
CERTIFICATE OF CORRECTION

PATENT NO. : 7,615,954 B1  
APPLICATION NO. : 11/324920  
DATED : November 10, 2009  
INVENTOR(S) : Richard W. Potter Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this  
Tenth Day of May, 2011

David J. Kappos  
*Director of the United States Patent and Trademark Office*